(12) United States Patent
Jang et al.

(10) Patent No.: US 7,465,327 B2
(45) Date of Patent: Dec. 16, 2008

(54) REFRIGERATOR HAVING AIR-CLEANER

(75) Inventors: Chan-Kyoo Jang, Changwon (KR);
Sang-Ho Park, Changwon (KR);
Jeong-Youl Lee, Changwon (KR)

(73) Assignee: LG Electronics Inc., Seoul (KR)

( * ) Notice: Subject to any disclaimer, the term of this patent is extended or adjusted under 35 U.S.C. 154(b) by 599 days.

(21) Appl. No.: 11/165,514

(22) Filed: Jun. 24, 2005

(65) Prior Publication Data
US 2005/0284113 A1 Dec. 29, 2005

(30) Foreign Application Priority Data

| Jun. 25, 2004 | (KR) | ...................... 10-2004-0047961 |
| Jun. 25, 2004 | (KR) | ...................... 10-2004-0048395 |
| Jun. 25, 2004 | (KR) | ...................... 10-2004-0048399 |
| Jun. 28, 2004 | (KR) | ...................... 10-2004-0049175 |
| Jul. 2, 2004 | (KR) | ...................... 10-2004-0051682 |

(51) Int. Cl.
*F24F 3/16* (2006.01)
*A62B 7/08* (2006.01)

(52) U.S. Cl. .......................... 55/385.1; 55/487; 55/493; 55/471; 55/472; 55/473; 62/440; 62/78; 62/331; 62/314; 62/441

(58) Field of Classification Search ................ 55/385.1, 55/487, 493, 471–473; 62/440, 78, 331, 62/314, 441
See application file for complete search history.

(56) References Cited

U.S. PATENT DOCUMENTS

| 5,230,220 | A  | * | 7/1993  | Kang et al. ..................... 62/78 |
| 5,501,084 | A  | * | 3/1996  | Chang et al. ................... 62/264 |
| 5,568,730 | A  | * | 10/1996 | Kim et al. ...................... 62/78 |
| 6,286,330 | B1 | * | 9/2001  | Kopf ............................. 62/314 |
| 6,454,841 | B1 | * | 9/2002  | Kaiser .......................... 96/224 |
| 2006/0260341 | A1 | * | 11/2006 | Meyvis ......................... 62/331 |

FOREIGN PATENT DOCUMENTS

| KR | 10-1997-0011742 | 3/1997 |
| KR | 20-0227503 | 4/2001 |

* cited by examiner

*Primary Examiner*—Jason M. Greene
*Assistant Examiner*—Minh-Chau T Pham
(74) *Attorney, Agent, or Firm*—KED & Associates, LLP

(57) ABSTRACT

A refrigerator having an air-cleaner is provided. The air-cleaner may include a case having at least an inlet and an outlet, and a blower that draws air in through the inlet through a filter unit, and discharges the air through the outlet. The filter unit may include a filter for purifying the air flowing there-through, a filter basket in which the filter is seated, and a door fixed to the filter basket so that the basket may be drawn in and out in a drawer-like fashion. The air-cleaner may also include fastening means for fastening the basket door to the filter basket, guiding means for guiding the mount and dismount of the filter basket, and locking means for keeping the filter basket positioned in the case.

30 Claims, 11 Drawing Sheets

REFRIGERATOR HAVING AIR-CLEANER

BACKGROUND OF THE INVENTION

1. Field of Invention

The present invention relates to a refrigerator, and more particularly, to a refrigerator in which an air-cleaner for purifying indoor air is provided on an upper surface of a refrigerator main body.

2. Description of the Prior Art

A refrigerator is an electric appliance for keeping foods fresh for a long time by refrigerating or freezing them. Herein, the present invention will be described in connection to a side-by-side type refrigerator in which a freezing chamber and a refrigerating chamber are formed side by side.

FIG. 1 shows a refrigerator having an air-cleaner according to a prior art.

As shown in the figure, an air-cleaner 100 is detachably mounted on an upper surface of a refrigerator 10. The air-cleaner 100 comprises a case 110, filter units 120, a blower 130, and an anion generator 140. The case 110 is provided with inlets I and an outlet O through which air comes in and out. The filter units 120 serve to filter the air sucked through the inlets I. The blower 130 serves to suck the air through the inlets I and discharge the air filtered in the filter units 120 through the outlet O. The anion generator 140 generates anions to be discharged along with the air through the outlet O.

The case 110 includes a blower case 112 and filter cases 116. The blower case 112 is formed in a flat hexahedral shape with open both ends. The filter cases 116 are in communication with the both ends of the blower case 112. The outlet O is formed in a front surface of the blower case 112. The blower 130 and the anion generator 140 are provided in the blower case 112.

In addition, a pair of guide grooves 110a and 110b are formed in a bottom surface of the blower case 112. A pair of guide rails 10a and 10b, which are provided on the upper surface of the refrigerator 10, are inserted into the guide grooves 110a and 110b.

In the meantime, the inlets I are formed in outer ends of the filter cases 116. The filter units 120 are detachably mounted in the filter cases 116. The filter cases 116 are mounted to be movable from side to side in a state where they are fitted into the blower case 112. A pair of support portions 116a are formed on a bottom surface of each of the filter cases 116. The support portions 116a are supported on the upper surface of the refrigerator 10 so that the filter cases can be flush with the blower case 112.

In addition, a suction grille G is mounted in the inlet I. The suction grille G is provided with a filtering net that serves to filter out foreign materials from the air sucked through the inlets I. A filter mount opening 116h and guide ribs 116L are formed in a front surface and on a floor surface of each of the filter cases 116, respectively. The filter mount opening 116h and the guide ribs 116L are for the purpose of mounting and dismounting the filter unit 120.

The filter unit 120 includes a filter seating portion 126, an antibiotic filter 122, a dust collection filter 123, and a deodorizing filter 124. The filter seating portion 126 is formed in a substantially hexahedral shape with an open upper face. The filter seating portion 126 is mounted in the filter case 116 through the filter mount opening 116h.

Although not shown, the filter case 116 and/or the filter seating portion 126 are provided with fasteners. The fasteners serve to prevent the filter seating portion 126 from being detached from the filter case 116 inadvertently.

The filter seating portion 126 is guided by the guide ribs 116L. In addition, a plurality of guide portions 128a are provided in the filter seating portion 126. The guide portions 128a serve to secure the filters 122, 123, and 124.

The antibiotic filter 122, the dust collection filter 123, and the deodorizing filter 124 are provided in the filter seating portion 126 in this order from its outer end. The antibiotic filter 122, the dust collection filter 123, and the deodorizing filter 124 serve to remove various kinds of bacteria, dust and odor in air.

The blower 130 comprises a blowing fan (not shown), a fan housing 132, and a driving motor (not shown). An axial flow fan, which radially discharges air sucked axially, is used as the blowing fan. The blowing fan is installed in the fan housing 132. The driving motor serves to drive the blowing fan. The fan housing 132 is fastened with screws (not shown) to bosses provided on a floor surface of the blower case 112. When the driving motor drives the blowing fan, air is sucked through a lower portion of the fan housing 132 and discharged forward.

In addition, an air guide 134 is provided in the blower case 112. The air guide 134 guides air sucked by the blower 130 through the inlets I to be discharged through the outlet O. The interior of the blower case 112 is divided by the air guide 134 into a suction channel a and a discharge channel b.

In the meantime, the anion generator 140 is installed at a side of the discharge channel b adjacent to the blower 130. Anions generated in the anion generator 140 are discharged through the outlet O together with the air blown by the blower 130.

A display 152 is provided at a side of the front surface of the blower case 112. The display 152 serves to display an operational state of the air-cleaner 100 to the outside. In addition, an operating unit 154 is provided at the side of the front surface of the blower case 112 adjacent to the display 152. The operating unit 154 receives a variety of signals for operating the air-cleaner 100.

However, the refrigerator having the air-cleaner according to the prior art has the following problems.

The filter seating portion 126 may be mounted in the filter case 116 out of place, or a front surface of the filter seating portion 126 may be slanted with respect to the front surface of the filter case 116 due to the distortion of the filter seating portion 126 itself and the like. However, in the prior art, even if such a case occurs, the relative slant of the filter seating portion 126 cannot be corrected, resulting in deterioration of a front appearance of the air-cleaner 100.

In addition, in order to replace or clean the filters 122, 123 and 124, the filter seating portion 126 should be drawn out of the filter case 116. To this end, the fasteners that cause the filter seating portion 126 to be fastened in the filter case 116 should be released. Then, the filter seating portion 126 is drawn out of the filter case 116. That is, it is required to perform two operations: the operation for releasing both the filter case 116 and the filter seating portion 126 fastened to each other and the operation for drawing the filter seating portion 126 from the filter case 116.

Air sucked through the inlets I is introduced into a lower face of the fan housing 132 in the axial direction of the blowing fan. That is, a flow passage along which the air sucked through the inlet I is introduced into the fan housing 132 is relatively prolonged. Thus, the efficiency of the air-cleaner 100 is deteriorated.

In the meantime, the air introduced through the lower face of the fan housing 132 is discharged through a front face of the fan housing 132. Then, the air discharged through the front face of the fan housing 132 is discharged to the interior of a room through the outlet O. At this time, the air discharged to the front face of the fan housing 132 flows toward the middle of the outlet O. Therefore, there is a problem in that the air discharged through the outlet O cannot be discharged uniformly even though the air is guided by the air guide 134.

In addition, the fan housing 132 is fastened with screws to the bosses provided on the bottom surface of the blower case 112. Therefore, vibration generated when the blowing fan installed in the fan housing 132 operates is transmitted to the air-cleaner 100 and the refrigerator through the fan housing 132 and the bosses. Thus, due to the vibration generated when the blower 130 operates, noise may occur. In addition, due to the vibration, there are problems in that parts of the refrigerator or the air-cleaner 100 may be damaged or the fastened portions thereof are released, and thus, the durability of the article is deteriorated.

The display 152 is provided at the side of the front surface of the case 110. However, an area that the display 152 may occupy in the front surface of the case 110 is limited to an area obtained at least except an area that the outlet O occupies in the front surface of the case 110. Therefore, there is a problem in that it is not impossible to easily check whether the air-cleaner 100 operates, through the display 152 at positions remote from the refrigerator.

SUMMARY OF THE INVENTION

Accordingly, the present invention is conceived to solve the aforementioned problems in the prior art. An object of the present invention is to provide a refrigerator having an air-cleaner with an improved front appearance.

Another object of the present invention is to provide a refrigerator having an air-cleaner in which filters can be easily replaced.

A further object of the present invention is to provide a refrigerator having an air-cleaner in which a flow passage of air to be introduced into a blower is relatively short.

A still further object of the present invention is to provide a refrigerator having an air-cleaner capable of discharging purified air uniformly.

A still further object of the present invention is to provide a refrigerator having an air-cleaner in which vibration generated while the air-cleaner operates is minimized.

A still further object of the present invention is to provide a refrigerator having an air-cleaner capable of easily checking whether the air-cleaner operates, even at positions remote from the refrigerator According to an aspect of the present invention for achieving the objects, there is provided a refrigerator having an air-cleaner, comprising: a main body including a predetermined storage space; and the air-cleaner including a case fixed to the main body and having at least an inlet and an outlet, a filter unit for filtering air sucked through the inlet, and a blower for sucking air through the inlet and discharging the air filtered in the filter unit through the outlet, wherein the filter unit comprises: at least a filter for purifying the air sucked through the inlet; a filter basket detachably mounted in the case, the filter being seated in the filter basket; a basket door fixed to the filter basket and drawn out in a drawer-like fashion to selectively open and close the case; a fastening means for fastening the basket door to the filter basket; a guiding means for guiding the mount and dismount of the filter basket; and a locking means for keeping the filter basket to be mounted in the case.

The fastening means may comprise: a fastening box provided on a rear surface of the basket door to protrude rearward and formed in a hexahedral shape with an open rear face; at least a fastening hook provided on the fastening box to be elastically deformable, the fastening hook having a distal end on which a catching protrusion is provided; at least a contact rib provided in the fastening box and extending rearward; a fastening portion provided on a front surface of the filter basket and horizontally extending forward, so that an upper inside surface of the fastening box is brought into close contact with an upper surface of the fastening portion; and a fastening piece extending downward from a distal end of the fastening portion, elastically fastened to the fastening hook, and having an edge of a rear surface caught to the catching protrusion and a front surface brought into close contact with a distal end of the contact rib.

The basket door may be fastened to change a relative position thereof with respect to the filter basket.

In a state where the basket door is fastened to the filter basket, a distal end of the fastening piece may be spaced apart by a predetermined distance from a lower inside surface of the fastening box, and both ends of the fastening portion and fastening piece are spaced apart by a predetermined distance from inner surfaces of both sides of the fastening box.

The guiding means may comprise: a guide groove formed in a floor surface of the case to extend in a mount and dismount direction of the filter basket; and at least a support rail formed on the floor surface of the case corresponding to the interior of the guide groove to extend in the mount and dismount direction of the filter basket, thus supporting a bottom surface of the filter basket on an upper surface of the support rail.

The locking means may comprise: a push latch provided on any one of a front surface of the case and a rear surface of the basket door brought into close contact with the front surface of the case; and a latch hook provided on the other one of the front surface of the case and a rear surface of the basket door brought into close contact with the front surface of the case, the latch hook being inserted in the push latch.

The locking means may further comprise an elastic member provided in the case, the elastic member exerting an elastic force to the filter basket in a direction in which the filter basket is drawn out.

The blower may comprise: a cross flow fan with a rotating shaft horizontally installed; a fan housing in which the cross flow fan is installed; and a driving motor for operating the cross flow fan.

Upper and/or lower ends of both side surfaces of the fan housing and upper and/or lower ends of front and rear surfaces of the fan housing adjacent thereto may be at least partially in close contact with a side guide portion protruding from at least a surface of ceiling and floor surfaces of the case perpendicularly thereto, and at least one of upper and bottom surfaces of the fan housing is supported by a bottom surface support portion protruding on at least one of the ceiling and floor surfaces of the case.

The refrigerator may further comprise a vibration preventing means for preventing vibration generated in a process of operating the blower from being transmitted to the air-cleaner and the main body.

The vibration preventing means may include a shock absorbing portion provided between the fan housing and the side guide portion and bottom surface support portion and between the fan housing and the ceiling or floor surface of the case.

The refrigerator may further comprise a display unit emitting light when the air-cleaner operates, wherein the light of the display unit is transmitted to the outside through a gap between the outlet and a decor panel for selectively opening and closing the outlet.

A shield plate may be provided between the outlet and the display unit, the shield plate preventing the light of the display unit from being directly transmitted to the outside.

The display unit may comprise at least a light emitting diode and a printed circuit board to which the light emitting diode is fixed.

A lower end of the printed circuit board may be inserted into at least an insertion piece, and the insertion piece is arranged on a floor surface of the case adjacent to the outlet in a straight line in parallel with the outlet.

According to another aspect of the present invention, there is provided a refrigerator having an air-cleaner, comprising: a main body including a predetermined storage space; and the air-cleaner including a case fixed to the main body and having at least an inlet and an outlet, a filter unit for filtering air sucked through the inlet, and a blower for sucking air through the inlet and discharging the air filtered in the filter unit through the outlet, wherein the filter unit comprises: at least a filter for purifying the air sucked through the inlet; a filter basket detachably mounted in the case, the filter being seated in the filter basket; a basket door fixed to the filter basket and drawn out in a drawer-like fashion to selectively open and close the case; and a fastening means for fastening the basket door to the filter basket, wherein the basket door is fastened to change a relative position thereof with respect to the filter basket.

The fastening means may comprise: a fastening box provided on a rear surface of the basket door to protrude rearward and formed in a hexahedral shape with a rear face opened; at least a fastening hook provided on the fastening box to be elastically deformable, the fastening hook having a distal end on which a catching protrusion is provided; at least a contact rib provided in the fastening box and extending rearward; a fastening portion provided on a front surface of the filter basket and horizontally extending forward, so that an upper inside surface of the fastening box is brought into close contact with an upper surface of the fastening portion; and a fastening piece extending downward from a distal end of the fastening portion, elastically fastened to the fastening hook, and having an edge of a rear surface caught to the catching protrusion and a front surface brought into close contact with a distal end of the contact rib.

According to another aspect of the present invention, there is provided a refrigerator having an air-cleaner, comprising: a main body including a predetermined storage space; and the air-cleaner including a case fixed to the main body and having at least an inlet and an outlet, a filter unit for filtering air sucked through the inlet, and a blower for sucking air through the inlet and discharging the air filtered in the filter unit through the outlet, wherein the filter unit comprises: at least a filter for purifying the air sucked through the inlet; a filter basket detachably mounted in the case, the filter being seated in the filter basket; a basket door fixed to the filter basket and drawn out in a drawer-like fashion to selectively open and close the case; and a locking means for keeping the filter basket to be mounted in the case, and the locking means comprises: a push latch provided on any one of a front surface of the case and a rear surface of the basket door brought into close contact with the front surface of the case; a latch hook provided on the other one of the front surface of the case and a rear surface of the basket door brought into close contact with the front surface of the case, the latch hook being inserted in the push latch; and an elastic member provided in the case, the elastic member exerting an elastic force to the filter basket in a direction in which the filter basket is drawn out.

According to another aspect of the present invention, there is provided a refrigerator having an air-cleaner, comprising: a main body including a predetermined storage space; and the air-cleaner including a case fixed to the main body and having at least an inlet and an outlet, a filter unit for filtering air sucked through the inlet, a blower for sucking air through the inlet and discharging the air filtered in the filter unit through the outlet, and a vibration preventing means for preventing vibration generated in a process of operating the blower from being transmitted to the air-cleaner and the main body, wherein the blower comprises: a cross flow fan with a rotating shaft horizontally installed; a fan housing in which the cross flow fan is installed; and a driving motor for operating the cross flow fan.

Upper and/or lower ends of both side surfaces of the fan housing and upper and/or lower ends of front and rear surfaces of the fan housing adjacent thereto may be at least partially in close contact with a side guide portion protruding from at least a surface of ceiling and floor surfaces of the case perpendicularly thereto, and at least one of upper and bottom surfaces of the fan housing is supported by a bottom surface support portion protruding on at least one of the ceiling and floor surfaces of the case.

The vibration preventing means may include a shock absorbing portion provided between the fan housing and the side guide portion and bottom surface support portion and between the fan housing and the ceiling or floor surface of the case.

According to another aspect of the present invention, there is provided a refrigerator having an air-cleaner, comprising: a main body including a predetermined storage space; and the air-cleaner including a case fixed to the main body and having at least an inlet and an outlet, a filter unit for filtering air sucked through the inlet, a blower for sucking air through the inlet and discharging the air filtered in the filter unit through the outlet, and a display unit for displaying an operational state to the outside, wherein the display unit emits light when the air-cleaner operates, and the light of the display unit is transmitted to the outside through a gap between the outlet and a decor panel for selectively opening and closing the outlet.

A shield plate may be provided between the outlet and the display unit, the shield plate preventing the light of the display unit from being directly transmitted to the outside.

The display unit may comprise at least a light emitting diode and a printed circuit board to which the light emitting diode is fixed.

BRIEF DESCRIPTION OF THE DRAWINGS

The above and other objects, features and advantages of the present invention will become apparent from the following description of a preferred embodiment given in conjunction with the accompanying drawings, in which.

DETAILED DESCRIPTION OF THE PREFERRED EMBODIMENT

Hereinafter, a preferred embodiment of a refrigerator having an air-cleaner according to the present invention will be described in detail with reference to the accompanying drawings.

Figure 1:
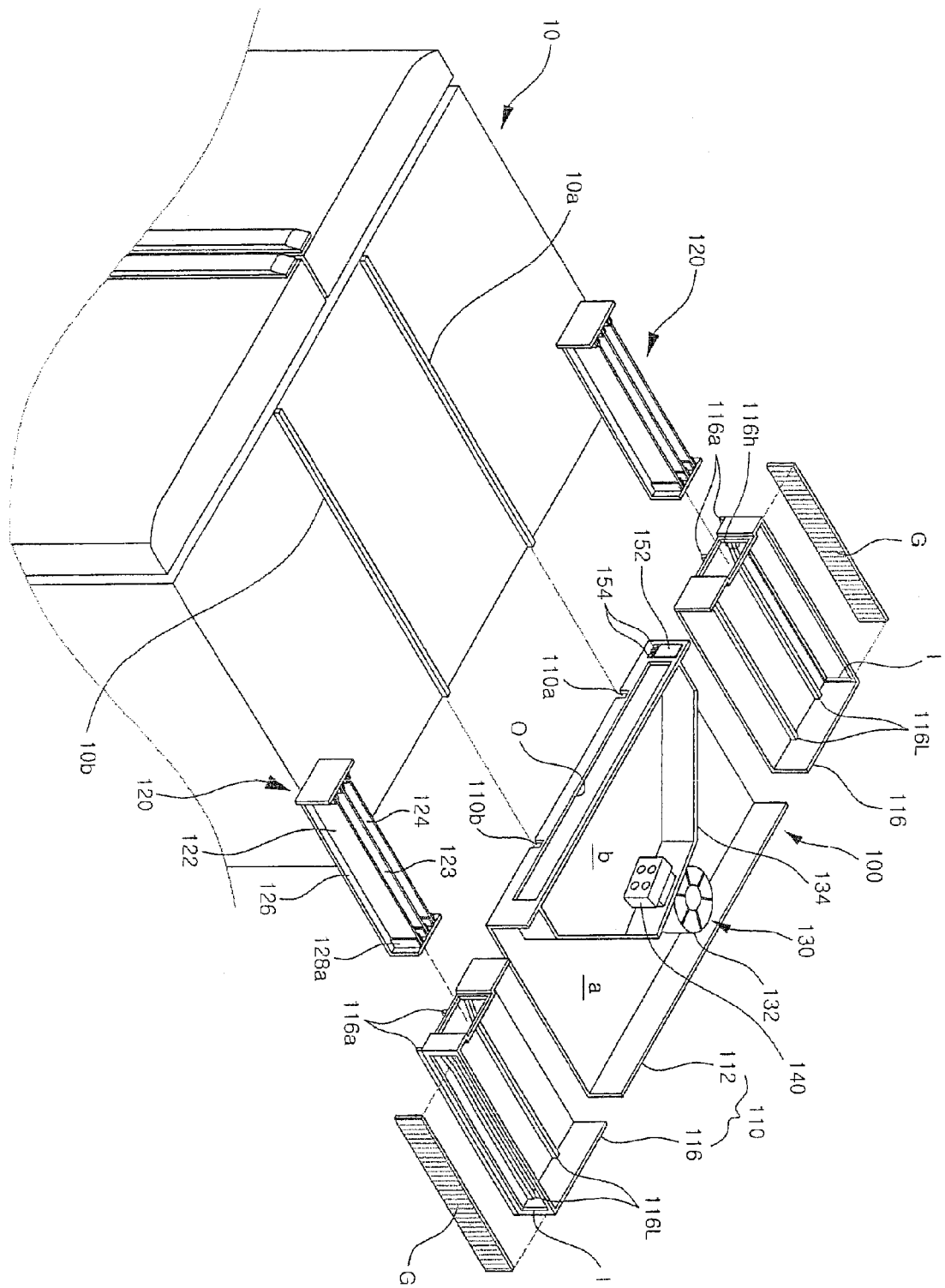
FIG. 1 is an exploded perspective view showing the interior of a refrigerator having an air-cleaner according to a prior art in a state where a cover of the air-cleaner is removed.
Figure 2:
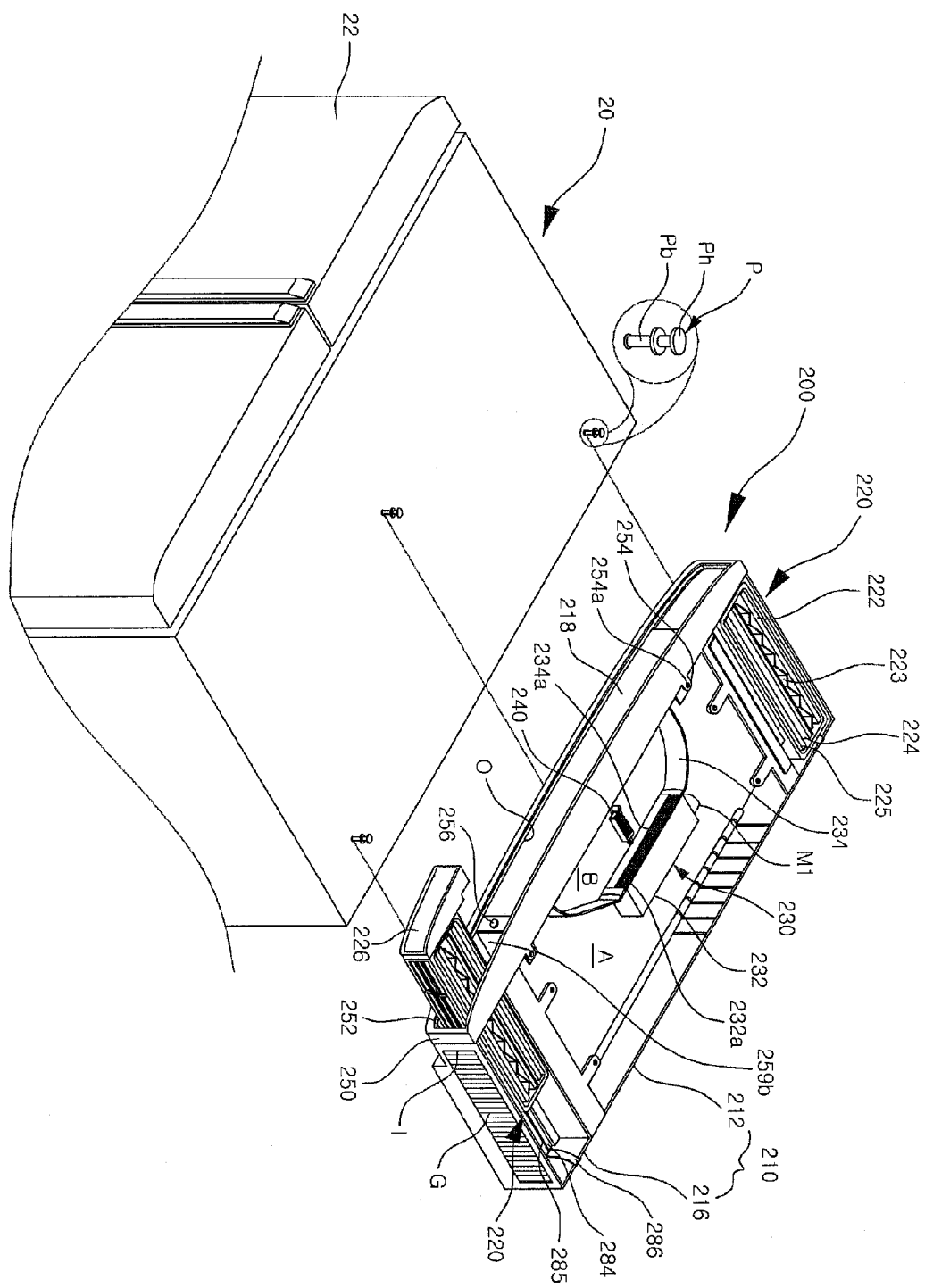
FIG. 2 is a perspective view showing the interior of a refrigerator having an air-cleaner according to the present invention in a state where a cover of the air-cleaner is removed.
Figure 3:
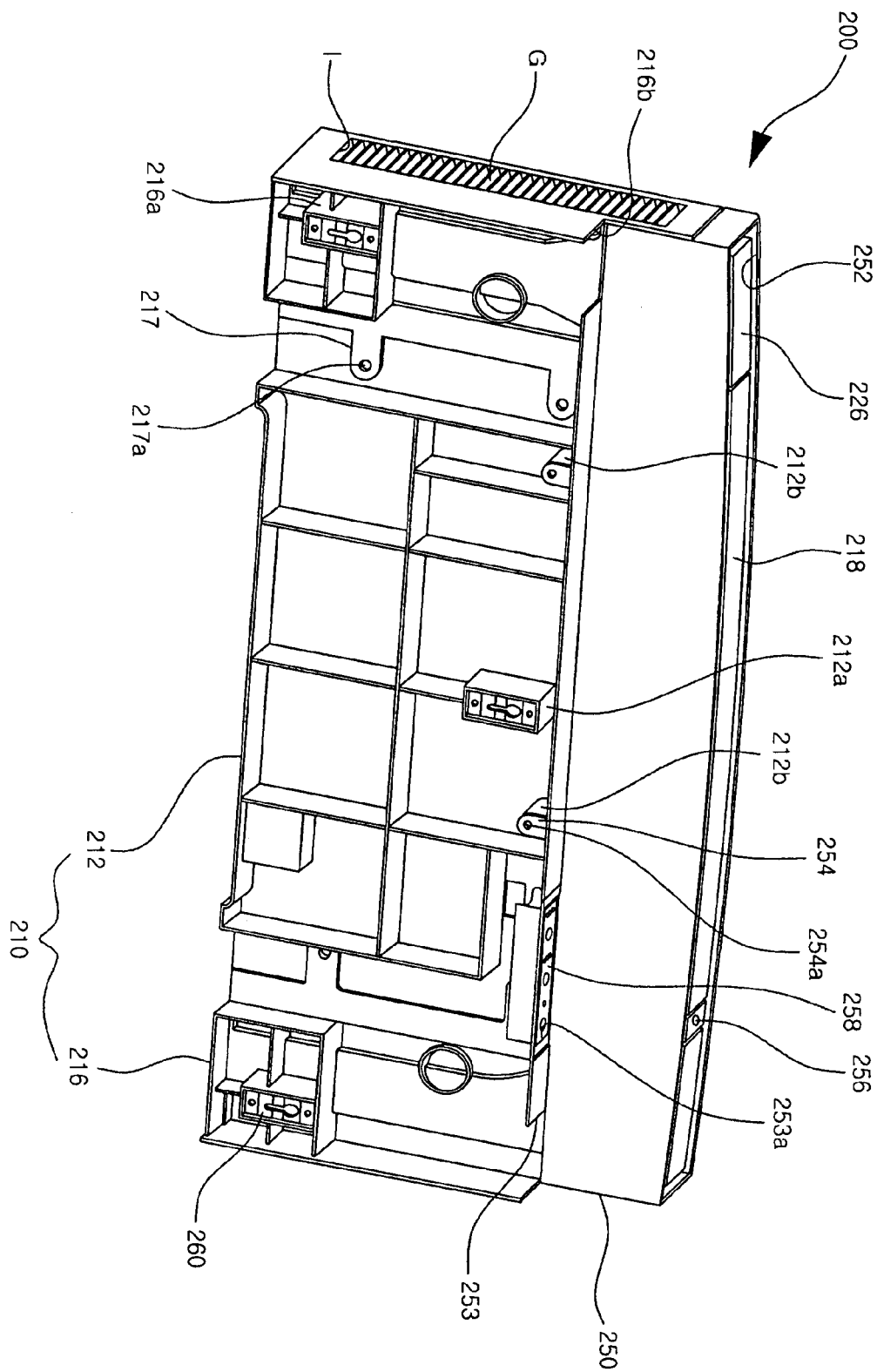
FIG. 3 is a perspective view showing a bottom surface of the air-cleaner of the embodiment shown in FIG. 2.
Figure 4:
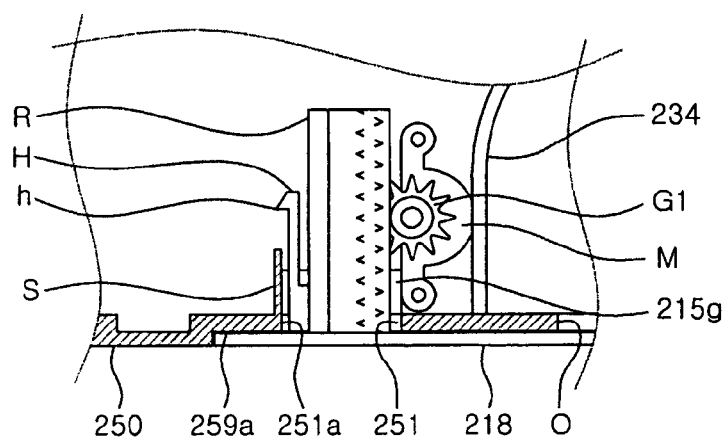
FIG. 4 is a plan view showing that a decor panel is connected to a case in the embodiment shown in FIG. 2.
Figure 5:
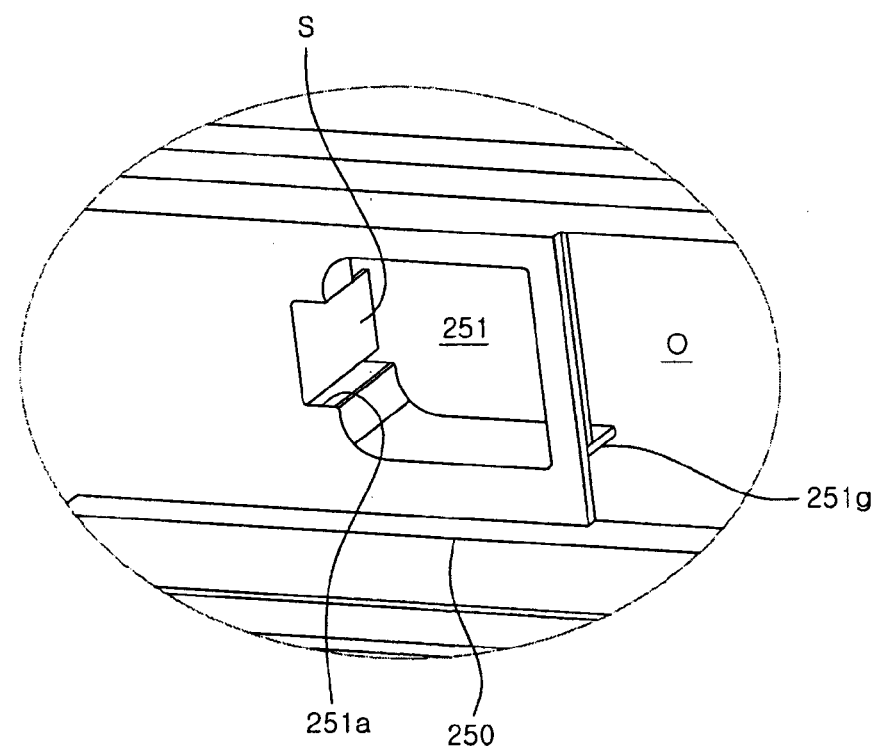
FIG. 5 is a perspective view showing a portion of a decor housing that is provided with a rack through-opening and a hook through-opening shown in FIG. 4.
Figure 6:
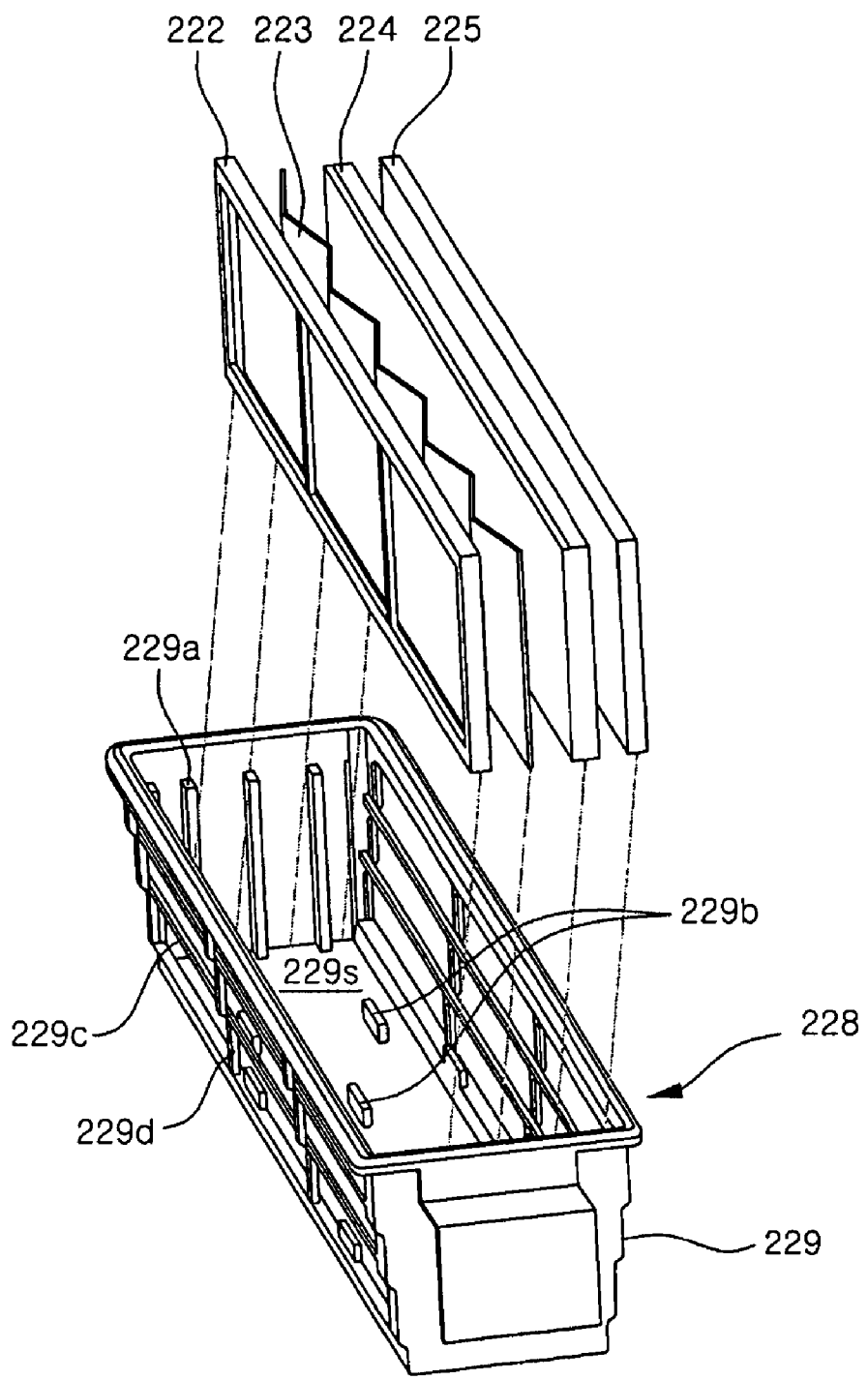
FIG. 6 is an exploded perspective view showing filters and a filter basket in the embodiment shown in FIG. 2.
Figure 7:
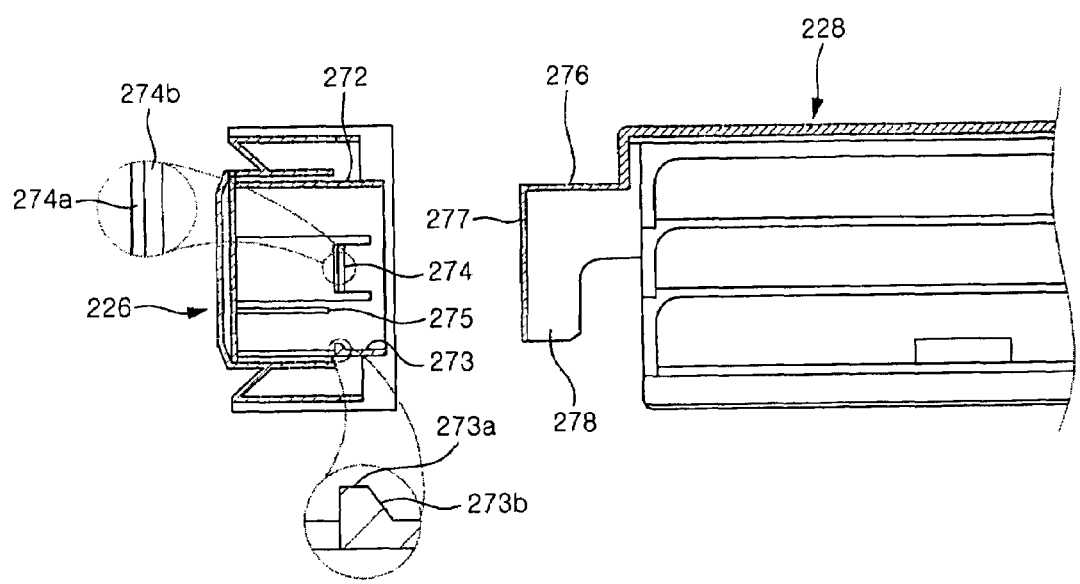
FIG. 7 is a side sectional view showing that the filter basket and a basket door are fastened to each other in the embodiment shown in FIG. 2.
Figure 8:
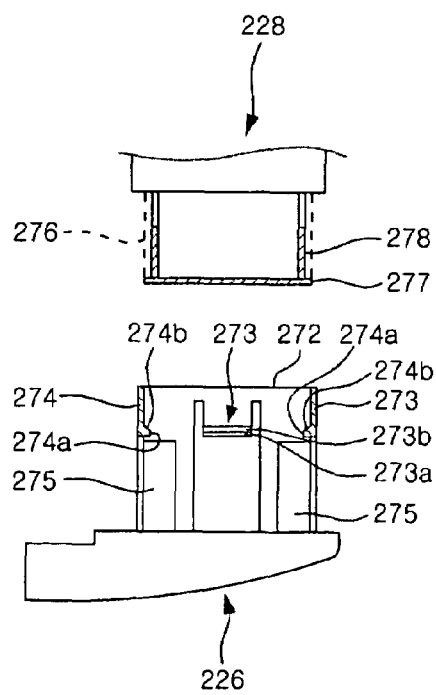
FIG. 8 is an exploded transverse sectional view showing that the filter basket and the basket door are fastened to each other in the embodiment shown in FIG. 2.
Figure 9:
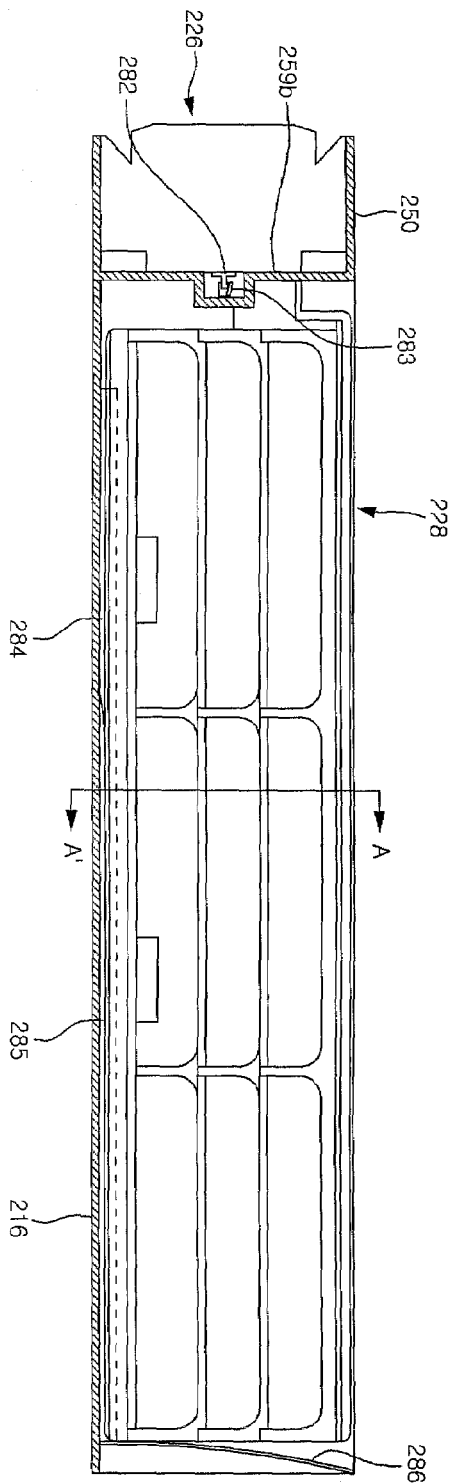
FIG. 9 is a side sectional view showing that the filter basket of the embodiment shown in FIG. 2 is mounted in the case.
Figure 10:
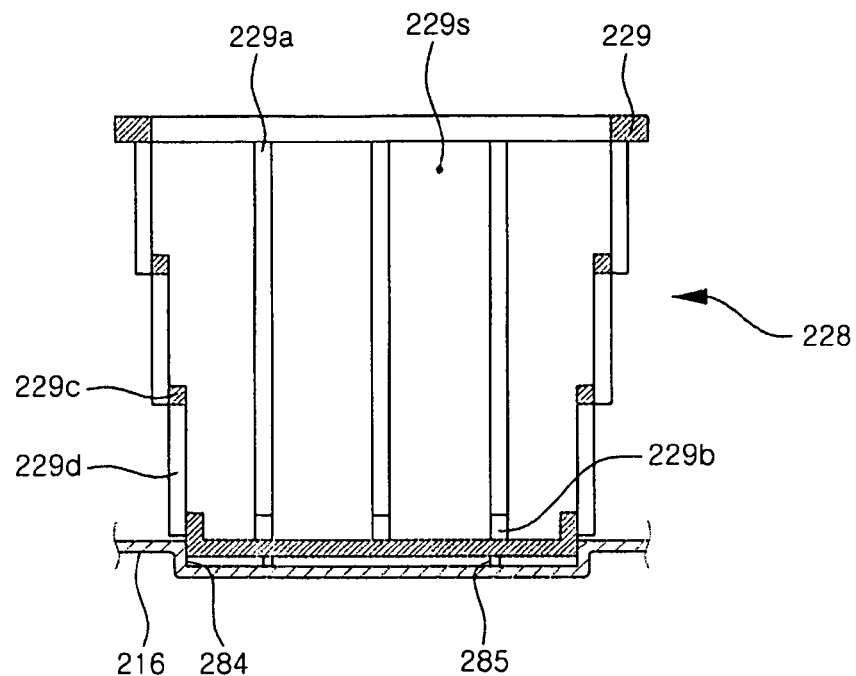
FIG. 10 is a sectional view taken along line A-A' of FIG. 9.
Figure 11A:
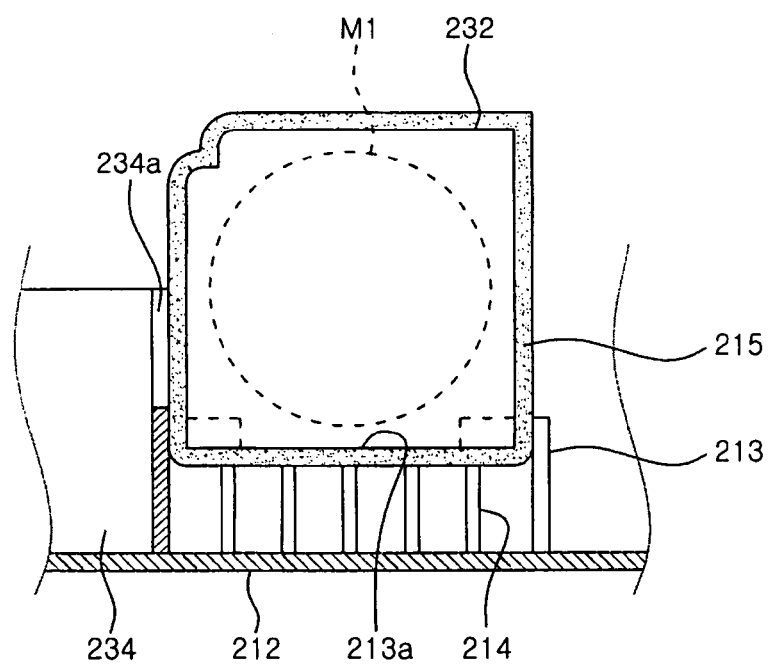
FIGS. 11a and 11b are side views showing that a fan housing is mounted to the case in the embodiment shown in FIG. 2.
Figure 11B:
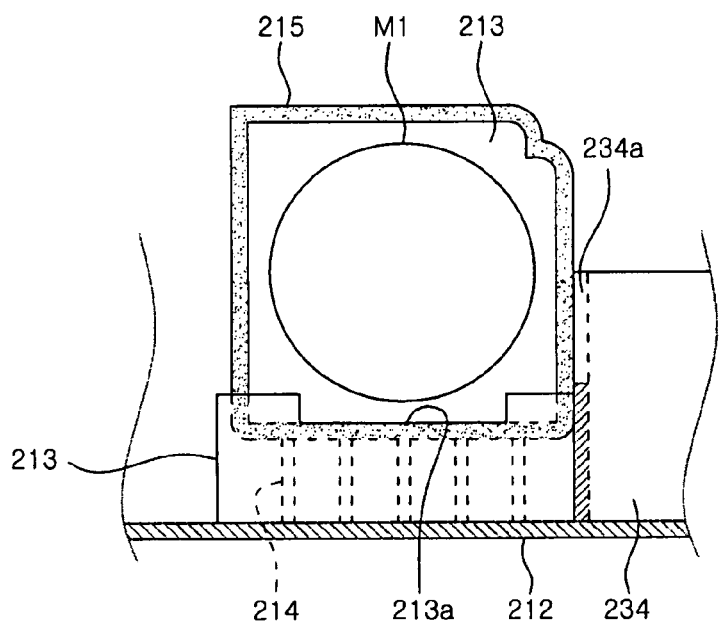
Figure 12:
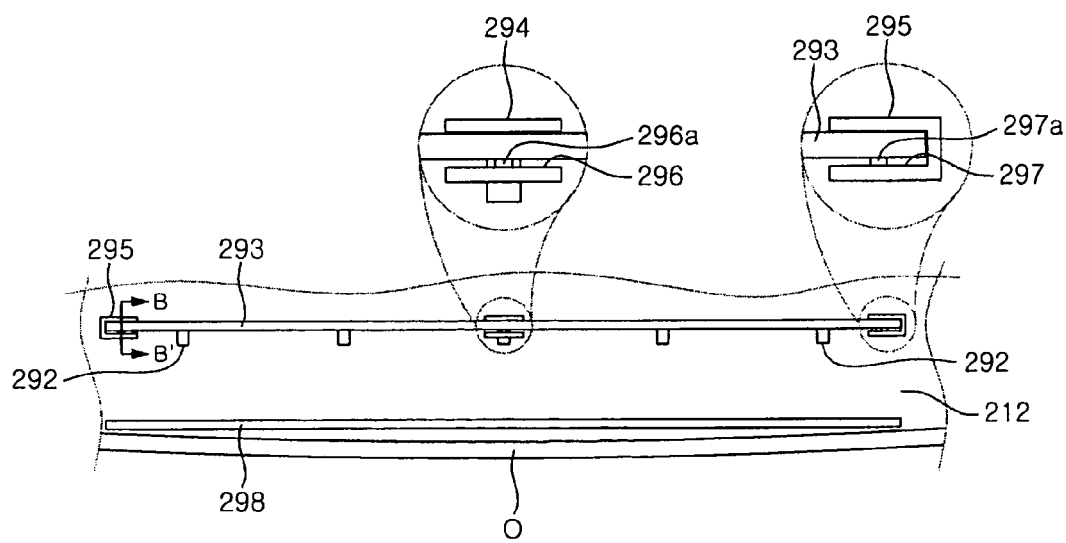
FIG. 12 is a plan view showing that a light emitting diode and a printed circuit board are mounted in the case in the embodiment shown in FIG. 2.
Figure 13:
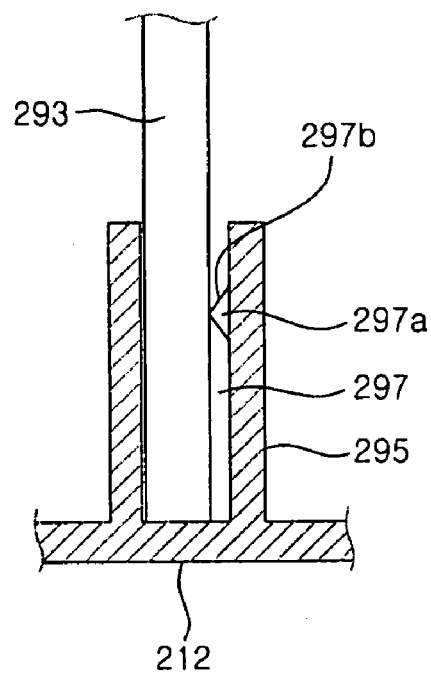
FIG. 13 is a sectional view taken along line B-B' of FIG. 12.
Figure 14:
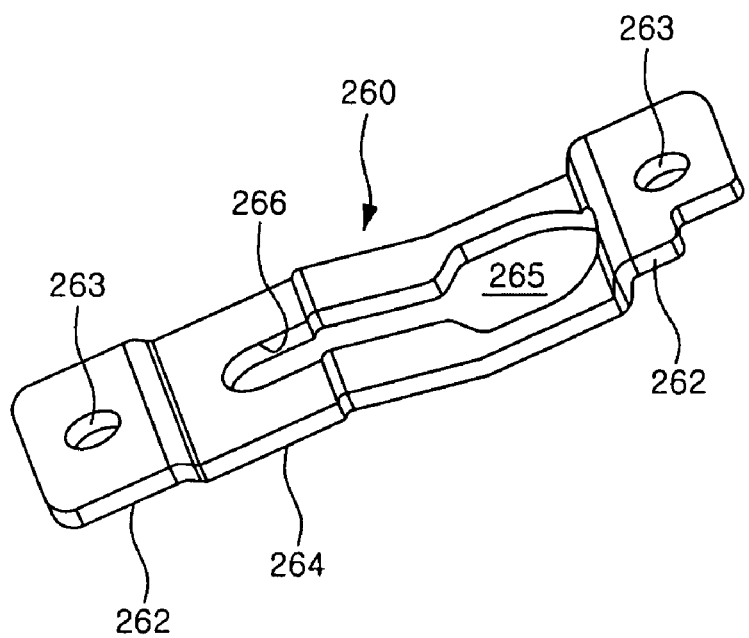
FIG. 14 is a perspective view of a mount bracket shown in FIG. 3.
Figure 15:
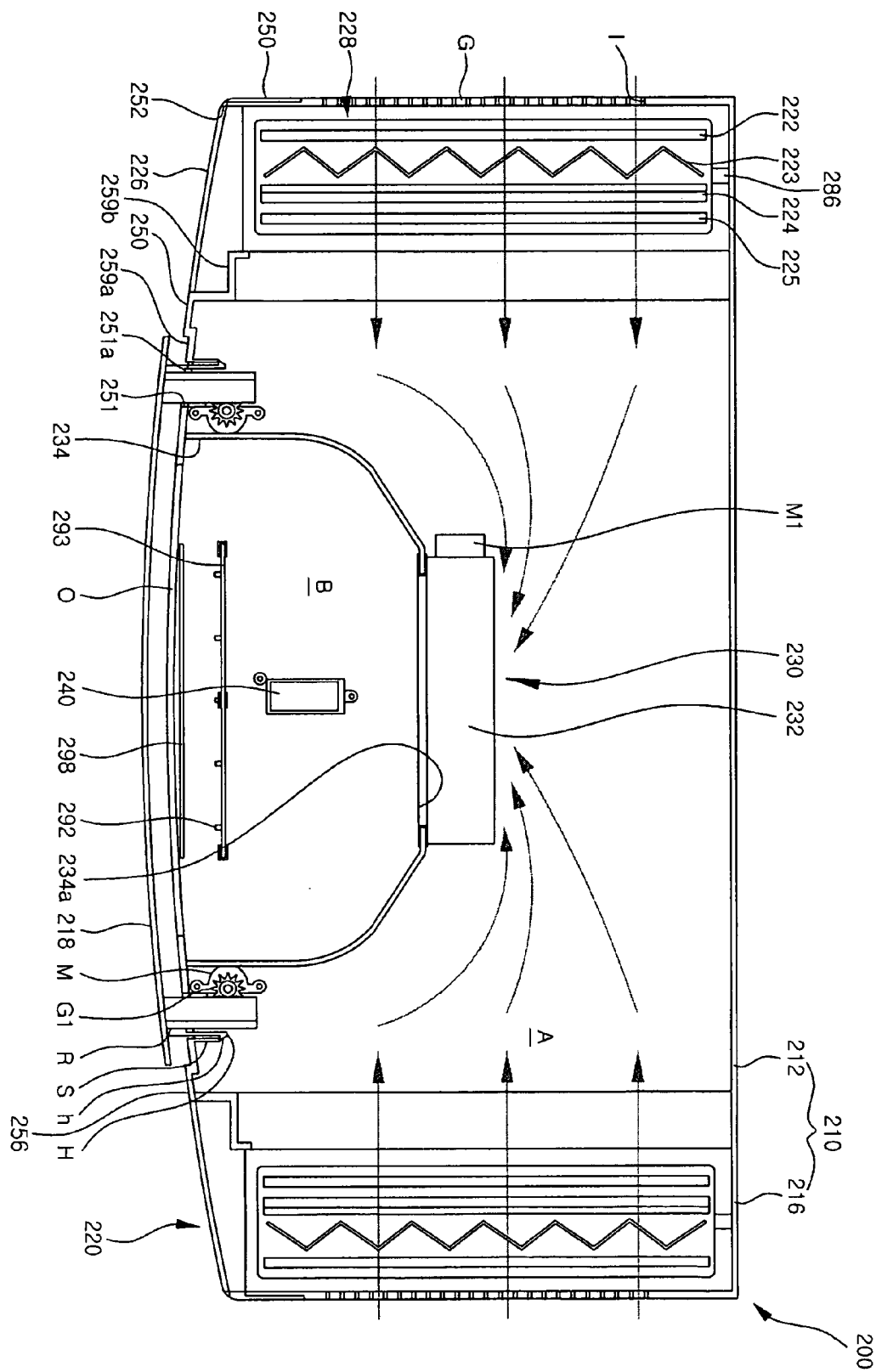
FIG. 15 is a view showing an airflow state within the air-cleaner in the embodiment shown in FIG. 2.

FIGS. 2 and 3 show the interior and a bottom surface of an air-cleaner in the preferred embodiment of the refrigerator having the air-cleaner according to the present invention; FIGS. 4 and 5 show that a decor panel is connected to a case in the embodiment shown in FIG. 2; FIG. 6 shows filters and a filter basket in the embodiment shown in FIG. 2; FIGS. 7 and 8 show that the filter basket and a basket door are fastened to each other in the embodiment shown in FIG. 2; FIGS. 9 and 10 show that the filter basket is mounted in the case in the embodiment shown in FIG. 2; FIGS. 11a and 11b show that a fan housing is mounted to the case in the embodiment shown in FIG. 2; FIGS. 12 and 13 show that a light emitting diode and a printed circuit board are mounted in the case in the embodiment shown in FIG. 2; FIG. 14 shows a mount bracket shown in FIG. 3; and FIG. 15 shows an airflow state within the air-cleaner in the embodiment shown in FIG. 2.

As shown in FIGS. 2 and 3, an air-cleaner 200 for purifying indoor air is provided on an upper surface of a refrigerator main body 20. An external appearance of the air-cleaner 200 is defined by a case 210. The case 210 includes a blower case 212 and a pair of filter cases 216. The blower case 212 is provided with an outlet O through which filtered air is discharged. Each of the filter cases 216 is provided with an inlet I through which air is sucked into the case 210.

The blower case 212 is formed in a flat hexahedral shape with an open front face and open both ends. An upper face of the blower case 212 is closed with a case cover (not shown). A seating portion 212a and a plurality of fastening bosses 212b are provided on a bottom surface of the blower case 212.

A mount bracket 260, which will be described below, is seated in the seating portion 212a. The seating portion 212a is provided substantially at the center of a front end of the bottom surface of the blower case 212. Fasteners (not shown) penetrating fastening holes 254a of a decor housing 250, which will be described below, are fastened to the fastening bosses 212b.

The outlet O is formed in a front surface of the decor housing 250 provided in front of the blower case 212. There is also provided a decor panel 218 for selectively opening and closing the outlet O. The decor panel 218 taking a shape corresponding to that of the outlet O is formed to be relatively wider laterally than the outlet O. As shown in FIG. 15, the decor panel 218 moves in a fore and aft direction of the blower case 212 and thus opens and closes the outlet O.

In order to operate the decor panel 218, as shown in FIG. 4, there are provided a pair of combinations of a step motor M, a gear G1 and a rack R. The step motors M provide a driving force for moving the decor panel 218. The step motors M are fixed to both sides of the front end of the blower case 212 adjacent to the outlet O. The gear G1, which is connected to a driving shaft of each of the step motors M, is engaged with the rack R. The racks R are provided at both sides of a rear surface of the decor panel 218. The rack R extends rearward to be substantially perpendicular to the rear surface of the decor panel 218 corresponding to the outside of the outlet O.

In addition, a catching hook H is provided at a side of the rack R. The catching hook H prevents the decor panel 218, which moves to the front of the case 210 by operating the step motor M from being entirely detached from the case 210. The catching hook H extends from the side of the rack R to the rear thereof by a predetermined length.

A proximal end of the catching hook H is secured to a front end of the rack R adjacent to the rear surface of the decor panel 218. A distal end of the catching hook H extends to the rear of the case 210. Thus, the catching hook H has predetermined elasticity in a lateral direction with respect to the rack R. In addition, a catching jaw h is provided at the distal end of the catching hook H. The catching jaw h is caught by a distal end of a stopper, which will be described below.

Referring again to FIG. 2, the filter case 216 is formed in a hexahedral shape elongated in a fore and aft direction. The filter cases 216 are mounted to both ends of the blower case 212 to be movable laterally. Each filter case 216 is open at upper and front faces and both ends thereof. The upper face of the filter case 216 is closed with a case cover (not shown).

An inner end of each filter case 216 is in communication with an open end of the blower case 212. The inlet I is provided at an outer end of each filter case 216. In addition, a suction grille G is mounted in the inlet I. The suction grille G is provided with a filtering net. The filtering nets serve to filter out foreign materials from the air sucked through the inlets I.

In addition, as shown in FIG. 3, a seating portion 216a is provided on a bottom surface of the filter case 216. The mount bracket 260 is seated in the seating portion 216a. The seating portion 216a is provided at a rear end of the bottom surface of the filter case 216 corresponding to a relatively rear portion as compared with the seating portion 212a of the blower case 212.

Support portions 216b are provided at rear and outer ends of the bottom surfaces of the filter cases 216. The support portions 216b serve to support the case 210 by allowing lower ends of the support portions 216b to be in close contact with the upper surface of the main body 20 when the air-cleaner 200 is seated on the upper surface of the main body 20.

A filter unit 220, which will be described below, is detachably mounted in each of the filter cases 216 via the front face of the filter case 216. In addition, at least a fastening piece 217 is provided at a lower end of the inner end of each filter case 216. The fastening piece 217 enables the blower case 212 and the filter case 216 to be fastened to each other.

The fastening piece 217 horizontally extends from the inner end of the bottom surface of the filter case 216 by a predetermined length. A fastening hole 217a is formed in the fastening piece 217. A fastener (not shown) penetrating the fastening hole 217a is selectively fastened to one of a plurality of fastening holes (not shown) formed in the bottom surface of the blower case 212. Thus, the width of the case 210 can be adjusted along the width of the upper surface of the main body 20.

Referring again to FIG. 2, there are provided the filter units 220 for purifying the air sucked into the case 210 through the inlets I. The filter unit 220 is installed in the filter case 216 via the open front face of the filter cases 216.

The filter unit 220 includes a plurality of filters 222, 223, 224 and 225, a filter basket 228, and a basket door 226. Each of the filters 222, 223, 224 and 225 is formed to take the shape of a panel with a predetermined thickness. The filters 222, 223, 224 and 225 are seated in the filter basket 228. The filter basket 228 is detachably mounted in the filter case 216. The basket door 226 fastened to the filter basket 228 is drawn out in a drawer-like fashion.

In the meantime, as shown in FIG. 6, the filters 222, 223, 224 and 225 include the antibiotic filter 222, the first and second dust collection filters 223 and 224, and the deodorizing filter 225. The antibiotic filter 222, the first dust collection filter 223, the second dust collection filter 224, and the deodorizing filter 225 are provided in this order from the inlet I.

The antibiotic filter 222 performs the antibiotic function of eliminating a variety of bacteria in air. The first and second dust collection filters 223 and 224 filter out dusts with different sizes contained in the air passing through the antibiotic filter 222, respectively. The deodorizing filter 225 removes odor in the air passing through the antibiotic filter 222 and the first and second dust collection filters 223 and 224.

A basket main body 229 of the filter basket 228 includes a seating space 229s. The filters 222, 223, 224 and 225 are seated in the seating space 229s. The basket main body 229 is formed in a substantially hexahedral shape in which an upper face and portions except upper edges of both longitudinal sides are open.

A plurality of guide ribs 229a and 229b are provided on front and rear inner surfaces and a bottom surface of the basket main body 229, respectively. The guide ribs 229a and 229b guide the filters 222, 223, 224 and 225 to predetermined positions so that the filters seated in the seating space 229s are not brought into close contact with each other.

In addition, a plurality of support ribs 229c and 229d are provided at both the open side faces of the basket main body 229. The support ribs 229c and 229d reinforce the basket main body 229 and protect the filters 222, 223, 224 and 225 seated in the seating space 229s.

Referring to FIG. 2, the basket doors 226 are formed to have a shape and size corresponding to basket door seating steps 259b of the decor housing 250, which will be described below. The basket door 226 serves to selectively open and close a filter through-hole 252, which will be described below. To this end, the basket door 226 fastened to the filter basket 228 is drawn out in a drawer-like fashion.

Further, as shown in FIGS. 7 and 8, a fastening box 272 is provided on a rear surface of the basket door 226. The fastening box 272 serves to fasten the basket door 226 and the filter basket 228 to each other. The fastening box 272, which is formed in a hexahedral shape with an open rear face, protrudes rearward from the rear surface of the basket door 226.

Fastening hooks 273 and 274 are provided at a lower portion and both sides of the fastening box 272. The fastening hooks 273 and 274 are formed to be elastically deformable. In the illustrated embodiment, the fastening hooks 273 and 274 are formed by cutting the lower portion and front ends of both the sides of the fastening box 272 relatively adjacent to the rear surface of the basket door 226. That is, the fastening hooks 273 and 274 are formed so that distal ends thereof extend toward the rear surface of the basket door 226 while proximal ends thereof are connected to a rear end of the fastening box 272. Thus, it is possible for the fastening hook 273 provided at the lower portion of the fastening box 272 to be elastically deformed vertically, while it is possible for the fastening hooks 274 provided at both the sides of the fastening box 272 to be elastically deformed laterally.

In addition, catching protrusions 273a and 274a are provided at the distal ends of the fastening hooks 273 and 274, respectively. A fastening piece 277, which will be described below, is caught by the catching protrusions 273a and 274a. The catching protrusion 273a of the fastening hook 273 provided at the lower portion of the fastening box 272 protrudes upwardly from an upper surface of the distal end of the fastening hook 273. The catching protrusions 274a of the fastening hooks 274 provided at both the sides of the fastening box 272 protrude from the surfaces of the fastening hooks 274 in a direction in which the catching protrusions 274a face each other.

Guide surfaces 273b and 274b are formed at one sides of the catching protrusions 273a and 274a, respectively. The guide surfaces 273b and 274b guide the fastening piece 277. The guide surface 273b of the fastening hook 273 provided at the lower portion of the fastening box 272 is formed to be inclined downward toward the rear of the fastening box 272, while the guide surfaces 274b of the fastening hooks 274 provided at both the sides of the fastening box 272 are formed to be inclined in a direction in which the guide surfaces 274b are spaced far away from each other toward the rear of the fastening box 272.

A pair of contact ribs 275 are provided in the fastening box 272. Distal ends of the contact ribs 275 are brought into close contact with a front surface of the fastening piece 277 caught by the fastening hooks 273 and 274. As shown in FIG. 8, the respective contact ribs 275 are integrally formed at inner surfaces of both the sides of the fastening box 272. The length of the contact rib 275 is determined such that the distal end of the contact rib 275 is spaced apart by the corresponding thickness of the fastening piece 277 from the distal end of the fastening hook 274.

In the meantime, a fastening portion 276 is provided on a front surface of the filter basket 228 corresponding to the rear surface of the basket door 226. The fastening portion 276 extends horizontally forwardly from the front surface of the filter basket 228. An upper surface of the fastening portion 276 is brought into close contact with an upper inside surface of the fastening box 272.

The fastening piece 277 is provided at a distal end of the fastening portion 276. When the fastening piece 277 is fastened to the fastening hooks 273 and 274, the fastening piece 277 is in close contact with the contact ribs 275. The fastening piece 277 vertically extends downwardly from the distal end of the fastening portion 276.

In a process of fastening the fastening piece 277 to the fastening hooks 273 and 274, edges of the fastening piece 277 are guided by the guide surfaces 273b and 274b. Then, in a state where the fastening piece 277 is fastened to the fastening hooks 273 and 274, edges of a rear surface of the fastening piece 277 are in close contact with the catching protrusions 273a and 274a. At this time, the portion of the front surface of the fastening piece 277 is in close contact with the contact ribs 275.

The basket door 226 is vertically and laterally movable with respect to the filter basket 228 in a state where the basket door 226 is fastened to the filter basket 228. This is to seat the basket door 226 accurately in the front face of the filter case 216, i.e., the basket door seating step 259b, when the filter basket 228 is mounted in the filter case 216.

Particularly, in a state where the fastening portion 276 is in close contact with the upper inside surface of the fastening box 272 and the fastening piece 277 is caught by the fastening hooks 273 and 274, the distal end of the fastening piece 277 is spaced apart by a predetermined distance from a lower inside surface of the fastening box 272. In addition, in such a state, both ends of the fastening portion 276 and fastening piece 277 are spaced apart by a predetermined distance from the inner surfaces of both the sides of the fastening box 272.

A reinforcement piece 278 is provided for reinforcing the fastening portion 276 and the fastening pieces 277. Two adjacent sides of the reinforcement piece 278 are connected to a bottom surface of the fastening portion 276 and an inside surface of the fastening piece 277, respectively. At this time, the reinforcement piece 278 is connected to the inside surfaces of the fastening portion 276 and fastening piece 277 spaced apart by a predetermined distance from both ends thereof.

As shown in FIGS. 9 and 10, a guide groove 284 is provided in a bottom surface of the filter case 216 in which the filter basket 228 is mounted. The guide groove 284 serves to guide the mount and dismount of the filter basket 228. The guide groove 284 is formed to extend in the fore and aft direction by causing a portion of the floor surface of the filter case 216 to be downwardly depressed to have a width corresponding to a lower end of the filter basket 228.

In addition, a pair of support rails 285 are provided on a portion of the floor surface of the filter case 216 corresponding to the interior of the guide groove 284. The support rails 285 serve to support the bottom surface of the filter basket 228. Like the guide groove 284, the support rails 285 extend in a direction in which the filter basket 228 is mounted and dismounted. The height of the support rails 285 is determined within such a range that the filter basket 228 is horizontal when it is supported. In the illustrated embodiment, the height of the support rails 285 is formed to be relatively lower than the depth of the guide groove 284.

In the meantime, referring to FIG. 2, a blower 230 is provided in the blower case 212. The blower 230 serves to suck air through the inlets I and discharge the air purified in the filter units 220 to the outside through the outlet O.

The blower 230 includes a cross flow fan (not shown), a fan housing 232, and a driving motor M1. The cross flow fan sucks air from its rear portion and discharges it to the front. The cross flow fan is installed in the fan housing 232. The driving motor M1 serves to drive the cross flow fan.

The fan housing 232 is formed to extend laterally in correspondence with the shape of the cross flow fan. An inflow portion (not shown), through which the air sucked through the inlets I is introduced into the fan housing 232, is provided in a rear surface of the fan housing 232. An outflow portion 232a, through which the air introduced into the fan housing 232 through the inflow portion and pressurized by the cross flow fan is discharged, is provided in a front surface of the fan housing 232.

As shown in FIGS. 11a and 11b, in order to support the fan housing 232, there are provided a pair of side guide portions 213 and a plurality of bottom surface support portions 214.

The side guide portions 213 protrude vertically from the floor surface of the blower case 212. The side guide portions 213 are substantially "⊏"-shaped to be in close contact with lower portions of both sides of the fan housing 232 and lower portions of front and rear surfaces adjacent thereto.

The bottom surface support portions 214 are provided on the floor surface of the blower case 212 between the side guide portions 213. A bottom surface of the fan housing 232 of which the front, rear and both side surfaces are partially in close contact with the side guide portions 213 is supported on the bottom surface support portions 214. To this end, the bottom surface support portions 214 are formed to be relatively lower than the side guide portions 213.

In the meantime, a seating groove 213a is provided in at least one of the side guide portions 213. The driving motor M1, which is fixed to a side surface of the fan housing 232, is seated in the seating groove 213a. The seating groove 213a is formed by cutting a portion of the side guide portion 213 into a shape corresponding to a lower end of the driving motor M1.

Shock absorbing portions 215 are formed on edges of both ends of the fan housing 232. The shock absorbing portions 215 serve to absorb vibration occurring when the blower 230 operates. To this end, the shock absorbing portions 215 are formed of a material with predetermined elasticity. The shock absorbing portions 215 are in close contact with the ceiling of the blower case 212, the side guide portions 213 and the bottom surface support portions 214.

In the meantime, as shown in FIG. 2, an air guide 234 is provided in the blower case 212. The air guide 234 serves to divide the interior of the blower case 212 into a suction channel A and a discharge channel B. The suction channel A causes the air sucked through the inlets I to be guided to the inflow portion of the fan housing 232. Then, the discharge channel B causes the air discharged through the outflow portion of the fan housing 232 to be guided to the outlet O. In addition, an aperture 234a is formed in a side of the air guide 234. The aperture 234a is in communication with the outflow portion of the fan housing 232.

In the meantime, an anion generator 240 is provided in the blower case 212. The anion generator 240 is positioned in the discharge channel B. Anions generated in the anion generator 240 are discharged through the outlet O together with the air blown by the blower 230.

As shown in FIGS. 2 and 3, the decor housing 250 is provided in the front end of the case 210. The decor housing 250 includes front, upper, lower, and both side surface portions so as to enclose the open front face and edges of the front end of the case 210 in a state where the blower case 212 and the filter cases 216 are fastened to each other.

Referring again to FIGS. 4 and 5, the outlet O rack through-openings 251, filter mount openings 252 are formed in the front surface of the decor housing 250. The outlet O is positioned at the front end of the discharge channel B. The respective racks R move through the rack through-openings 251. The basket doors 226 are mounted in the filter cases 216 through the filter mount openings 252, respectively.

In addition, a hook through-opening 251a is formed to be in communication with a side of each rack through-opening 251. The hook through-opening 251a is formed in a shape corresponding to the catching hook H. The catching hooks H penetrate the hook through-openings 251a. Stoppers S are provided on a front inside surface of the decor housing 250.

The stoppers S serve to prevent the decor panel 218 from being completely dismounted toward the front of the case 210. Each of the stoppers S extends to the rear of the case 210 from a side of the hook through-opening 251a corresponding to the catching hook H. When the decor panel 218 moves to the front of the case 210 and thus the outlet O is opened, the catching jaws h of the catching hooks H are caught by the front ends of the stoppers S.

In the meantime, an edge of the rack through-opening 251 and the hook through-opening 251a except the stopper S is provided with a guide portion 251g. The guide portion 251g serves to guide the movement of the rack R and catching hook H. The guide portion 251g extends rearward perpendicularly to the front inside surface of the decor housing 250 by a predetermined length form the edge of the rack through-opening 251 and hook through-opening 251a.

Panel seating steps 259a and the basket door seating steps 259b are provided in the front surface of the decor housing 250 (see FIG. 15). The panel seating steps 259a and the basket door seating steps 259b are formed to have a size and shape corresponding to the decor panel 218 and the basket doors 226, respectively. The decor panel 218 is seated on the panel seating steps 259a when the outlet O is closed. The basket doors 226 are seated on the basket door seating steps 259b when the filter baskets 228 are mounted in the filter cases 216.

As shown in FIG. 9, a latch hook 282 and a push latch 283 are provided on the rear surface of the basket door 226 and the front surface of the basket door seating step 259b corresponding thereto, respectively. By fixing the basket door 226 to the basket door seating step 259b in a state where the filter basket 228 is mounted in the filter case 216, the latch hook 282 and the push latch 283 serve to prevent the filter basket 228 from being detached inadvertently.

In the illustrated embodiment, the latch hook 282 is provided on the rear surface of the basket door 226, and the push latch 283 is provided on the front surface of the basket door seating step 259b corresponding to the rear surface of the basket door 226. The latch hook 282 is fixedly inserted into the push latch 283 by pushing the basket door 226 in a direction in which the rear surface of the basket door 226 is brought into close contact with the front surface of the basket door seating step 259b, i.e., to the right in FIG. 9. In such a state, when the basket door 226 is pushed to the right in the figure, the latch hook 282 is detached from the push latch 283.

An elastic lever 286 is provided on a rear surface of the interior of the filter case 216. The elastic lever 286 serves to exert an elastic force to the filter basket 228 in a direction in which the filter basket 228 is dismounted, i.e., to the left in FIG. 9. To this end, in a state where the filter basket 228 is mounted in the filter case 216, the elastic lever 286 is pushed rearward by the filter basket 228 and is in a compressed state.

In addition, referring to FIGS. 2 and 3, a plurality of fastening pieces 254 are provided on upper and lower surfaces of the decor housing 250. The fastening hole 254a is formed in each of the fastening pieces 254. The fasteners (not shown) for fixing the decor housing 250 to the case 210 penetrate through the fastening holes 254a.

An operating unit 256 is provided on a side of the front surface of the decor housing 250 between the outlet O and the filter mount opening 252. The operating unit 256 receives signals for operating the air-cleaner 200.

As shown in FIG. 3, a mount flange 253 is provided on a rear end of a lower surface of the decor housing 250. The mount flange 253 is placed at a position spaced part by a predetermined distance rearward from the front end of the case 210.

A mount hole 235a is formed in the mount flange 253. A display 258 is mounted in the mount hole 235a. The display 258 shows a variety of information on the operation of the air-cleaner 200.

The display 258 is installed such that its front surface is positioned to be flush with the front surfaces of the main body 20 and the mount flange 253. Thus, when doors 22 installed to the main body 20 are opened, the display 258 is exposed to the outside. However, when the doors 22 are closed, the display 258 is not exposed to the outside.

In addition, in order to provide a unified front appearance of the air-cleaner 200, it is preferred that the decor panel 218, the basket door 226 and the decor housing 250 be formed of the same material. For example, the decor panel 218, the basket door 226 and the decor housing 250 may be formed of an identical ABS resin.

As shown in FIGS. 12 and 13, a plurality of light emitting diodes 292 are provided in the case 210. In addition to the display 258, the light emitting diodes 292 serve to enable recognition as to whether the air-cleaner 200 operates.

That is, when the air-cleaner 200 operates, the light emitting diodes 292 emit light. Therefore, even though a user does not open the doors 22 to view the display 258, it is possible for the user to recognize whether the air-cleaner 200 operates.

The light emitting diodes 292 are fixed to a printed circuit board 293. The printed circuit board 293 is formed in a substantially rectangular shape extending in the lateral direction. The light emitting diodes 292 are provided on a surface of the printed circuit board 293 at predetermined intervals. The printed circuit board 293 is mounted to the blower case 212 to be adjacent to the outlet O. At this time, the light emitting diodes 292 are directed to the front of the air-cleaner 200, i.e., toward the outlet O.

A plurality of insertion pieces 294 and 295 for fixing the printed circuit board 293 are provided on the floor surface of the blower case 212. The insertion pieces 294 and 295 are provided on the floor surface of the blower case 212 in a straight line in parallel with the outlet O. It is preferred that the insertion pieces 294 and 295 be formed integrally with the blower case 212. A lower end of the printed circuit board 293 is inserted into the insertion pieces 294 and 295.

The insertion pieces 294 and 295 include the center insertion piece 294 and the end insertion pieces 295. A central portion of the lower end of the printed circuit board 293 is inserted into the center insertion piece 294, while both side ends of the printed circuit board 293 are inserted into the end insertion pieces 295.

An insertion groove 296 with an open upper face and open both sides is formed in the center insertion piece 294. Insertion grooves 297 with an open upper face and open facing sides are formed in the end insertion pieces 295.

In addition, contact protrusions 296a and 297a are provided in the insertion pieces 294 and 295 corresponding to the sides of the insertion grooves 296 and 297. The contact protrusions 296a and 297a serve to prevent the printed circuit board 293 from being detached inadvertently in a state where it is inserted into the insertion grooves 296 and 297. To this end, the contact protrusions 296a and 297a protrude from the sides to the opposite sides of the insertion grooves 296 and 297.

Guide surfaces 296b and 297b define upper surfaces of the contact protrusions 296a and 297a. The guide surfaces 296b and 297b serve to enable the printed circuit board 293 to be easily inserted into the insertion grooves 296 and 297. In the illustrated embodiment, the respective guide surfaces 296b and 297b are formed into an inclined flat surface.

In the meantime, a shield plate 298 is provided between the outlet O and the light emitting diodes 292. The shield plate 298 serves to prevent light from the light emitting diodes 292 that emit the light according to the operation of the air-cleaner 200 from being directly transmitted to the front through the outlet O. The shield plate 298 is formed to have a size and shape corresponding to the printed circuit board 293. The shield plate 298 may be formed integrally with the blower case 212.

As shown in FIG. 3, there are provided the mount brackets 260 for mounting the air-cleaner 200 to the main body 20. As shown in FIG. 14, each of the mount brackets 260 includes a pair of fixing portions 262 and a fastening portion 264. The fixing portions 262 are fixed to the bottom surface of the case 210. Then, the fastening portion 264 is coupled to the upper surface of the main body 20. The mount brackets 260 allow the air-cleaner 200 to be mounted to the upper surface of the main body 20 with an elastic force of the fastening portions 264 with respect to the fixing portions 262.

The fixing portions 262 are provided at both ends of the fastening portion 264. A fastening hole 263 is formed in each of the fixing portions 262. In a state where the mount brackets 260 are seated in the seating portions 212a and 216a of the case 210, screws (not shown) penetrating through the fastening holes 263 are fastened into fastening holes (not shown) formed in the seating portions 212a and 216a.

The fastening portion 264 is formed to be inclined at a predetermined angle with respect to the fixing portions 262. A passing hole 265 and an engaging slit 266 are formed in the fastening portion 264. The passing hole 265 is formed to have a shape corresponding to a head Ph of an engaging pin P fixed to the upper surface of the main body 20. The engaging slit 266 is in communication with the passing hole 265.

In a state where the head Ph of the engaging pin P penetrates through the passing hole 265, a body Pb of the engaging pin P moves along the engaging slit 266. At this time, the elastic force with which the head Ph pushes the fastening portion 264 causes the fastening portion 264 to be fastened to the upper surface of the main body 20.

Hereinafter, the operation of the refrigerator having the air-cleaner according to the present invention thus configured will be described.

In the preferred embodiment of the refrigerator having the air-cleaner according to the present invention, the process of mounting the air-cleaner to the upper surface of the refrigerator main body will be described.

First, the mount brackets 260 are seated in the seating portions 212a and 216a of the case 210. Then, the fixing portions 262 of the mount brackets 260 are fixed to the bottom surface of the case 210.

Next, the engaging pins P provided on the upper surface of the main body 20 are engaged with the fastening portions 264 of the mount brackets 260. Thus, the air-cleaner 200 is mounted on the upper surface of the main body 20. In addition, the support portions 216b of the case 210 are brought into close contact with the upper surface of the main body 20 and thus the air-cleaner 200 is supported.

In the meantime, the operation of the air-cleaner mounted on the refrigerator main body described above will be described in detail with reference to the accompanying drawings.

FIG. 15 shows an airflow state in the air-cleaner in the preferred embodiment of the refrigerator having the air-cleaner according to the present invention.

As shown in the figure, a signal for operating the air-cleaner 200 is first input by operating the operating unit 256. If the operational signal is input as above, the step motors M cause the gears G1 to rotate. Then, the racks R engaged with the gears G1 move through the rack through-openings 251. Thus, the decor panel 218 moves to the front of the case 210 and then the outlet O is opened.

At this time, the catching hooks H also penetrate through the hook through-openings 251a and then move to the front of the case 210. Then, when the catching hooks H move by a predetermined distance, the catching jaws h of the catching hooks H are brought into close contact with the distal ends of the stoppers S, respectively. Therefore, the decor panel 218 does not further move to the front of the case 210.

Then, the blower 230 operates. Thus, air is sucked into the case 210 through the inlets I. At this time, the filtering nets of the suction grilles G cause relatively large ones of foreign materials in the air sucked through the inlets I to be filtered out from the air. Then, the air passing through the suction grilles G is purified while passing through the filters 222, 223, 224 and 225 in this order.

The purified air passing through the filters 222, 223, 224 and 225 in this order is guided to the blower 230 by the suction channel A. At this time, the purified air is introduced through the inflow portion of the rear surface of the fan housing 232.

In the meantime, the continuous operation of the blower 230 causes the air introduced through the inflow portion of the fan housing 232 to be discharged through the outflow portion 232a of the fan housing 232. The air discharged through the outflow portion 232a is guided by the discharge channel B and discharged to the outside through the outlet O. At this time, the purified air is discharged together with anions generated in the anion generator 240 through the outlet O.

In addition, the air discharged through the outlet O is guided by the rear surface of the decor panel 218. Thus, the air discharged through the outlet O is ejected upwardly or downwardly by the decor panel 218.

However, the inflow portion and the outflow portion 232a of the fan housing 232 are formed in the rear and front faces of the fan housing 232 that are formed to extend in the lateral direction, respectively. Therefore, the flow passage along which the air sucked through the inlets I is introduced into the inflow portion becomes relatively short, and the air is also discharged into a relatively large area through the outflow portion 232a of the fan housing 232. That is, according to the present invention, the airflow by the blower 230 is more effectively performed.

In the meantime, when the air-cleaner 200 operates, the light emitting diodes 292 emit light. The light from the light emitting diodes 292 is transmitted to the outside through a gap between the outlet O and the decor panel 218. At this time, it is prevented that the light from the light emitting diodes 292 is directly transmitted to the room through the outlet O by the shield plate 298. Thus, the light from the light emitting diodes 292 can be prevented from dazzling users.

The printed circuit board 293 including the light emitting diodes 292 is inserted into the insertion grooves 296 and 297 of the insertion pieces 294 and 295. At this time, a surface of the printed circuit board 293 is pressed by the contact protrusions 296a and 297a. Thus, the printed circuit board 293 is inserted into the insertion pieces 294 and 295 and therefore prevented from being detached therefrom inadvertently.

In addition, the shock absorbing portions 215 provided between the fan housing 232 and the side guide portions 213 and bottom surface support portions 214 absorb vibration generated due to the operation of the blower 230. Particularly, the fan housing 232 is supported on the bottom surface support portions 214. That is, it is possible to minimize a contact area of the blower case 212 and the fan housing 232. Thus, since the vibration of the blower 230 is transmitted to the outside through the case 210 and the refrigerator the main body 20, noise does not occur and the durability of the product is not deteriorated.

Meanwhile, in order to stop the operation of the air-cleaner 200, the operational signal is input by operating the operating unit 256. The input operational signal causes the blower 230 to stop. Thus, air is not sucked and discharged through the inlets I and the outlet O.

At this time, the step motors M operate in a direction opposite to the direction in which they cause the decor panel 218 to move forward from the case 210. Accordingly, the rotation of the gears G1 causes the racks R to move into the case 210 through the rack through-openings 251. Thus, the decor panel 218 moves toward the rear of the case 210 and closes the outlet O.

A process of replacing the filters seated in the filter basket will be described in detail.

In order to replace or clean the filters 222, 223, 224 and 225, the filter basket 228 should be detached from the filter case 216 that is mounted thereto. To this end, the basket door 226 is pushed in the direction in which it is brought into close contact with the basket door seating step 259b. Thus, the latch hook 282 is released from a state where it is inserted into the push latch 283.

At this time, the filter basket 228 receives the elastic force from the elastic lever 286 provided on the rear surface of the interior of the filter case 216. Thus, the filter basket 228 moves to the front of the filter case 216 and is dismounted from the filter case 216. Further, in such a dismount process, the filter basket 228 is guided along the guide groove 284. The bottom surface of the filter basket 228 slides while being supported on the support rails 285.

Next, the filters 222, 223, 224 and 225 seated in the filter basket 228 are separated therefrom. After replacing the filters 222, 223, 224 and 225 with new ones or cleaning them, they are seated in the filter basket 228 again. Then, the filter basket 228 is pushed in through the filter through-hole 252. Therefore, the filter basket 228 is mounted in the filter case 216 again.

Then, the basket door 226 is pushed in the direction in which it is brought into close contact with the basket door seating step 259b. Thus, the latch hook 282 is inserted into the push latch 283, so that the basket door 226 is fixed to the basket door seating step 259b. At this time, the elastic lever 286 is compressed to the rear of the filter case 216 by the filter basket 228. That is, the elastic lever 286 causes the filter basket 228 to receive the elastic force directed to the front of the filter case 216.

In the meantime, a process of fastening the basket door and the filter basket to each other will be described in detail.

First, the fastening portion 276 and the fastening piece 277 are inserted into the fastening box 272. At this time, the upper surface of the fastening portion 276 is brought into close contact with the upper inside surface of the fastening box 272. In addition, the fastening piece 277 causes the fastening hooks 273 and 274 to elastically move downward and laterally, respectively, and is then fastened to the fastening hooks 273 and 274. The front surface of the fastening piece 277 is brought into close contact with the contact ribs 275.

In the meantime, the basket door 226 may vertically and laterally move in a state where it is fastened to the filter basket 228. Thus, the basket door 226 may vertically and laterally move with respect to the filter basket 228. That is, in a state where the filter basket 228 is mounted in the filter case 216, it is possible to correct the relative position of the basket door 226 with respect to the filter case 216. Thus, the basket door 226 can be seated on the correct position of the basket door seating step 259b.

According to the refrigerator having the air-cleaner of the present invention, the following advantages can be expected.

First, in the present invention, the basket door for drawing the filter basket mounted in the air-cleaner is configured so that the position of the basket door can be corrected vertically and laterally with respect to the filter basket. Thus, the front appearance of the air-cleaner can be improved.

In addition, in the present invention, the filter basket in which the filters are seated can be drawn out by pushing the basket door. Therefore, it is possible to replace and clean the filters easily.

Furthermore, as the blowing fan for sucking and discharging air into and out of the air-cleaner, a cross flow fan is employed in the present invention. Thus, indoor air is sucked into the air-cleaner through the inlets provided in both sides of the air-cleaner and discharged to the indoor through the outlet provided in the front surface of the air-cleaner. Therefore, the flow passage of the air to be purified by the air-cleaner can be formed to be relatively short, so that the efficiency of sucking and discharging air is improved.

In addition, the outflow portion through which air is discharged is formed to extend in the lateral direction corresponding to the shape of the cross flow fan. Thus, air discharged to the outside through the outlet of the air-cleaner is delivered widely in the lateral direction, so that the purified air can be uniformly discharged.

Further, the vibration generated when the cross flow fan and the driving motor operate is prevented from being transmitted to the outside by means of the shock absorbing portions. Thus, it is possible to prevent the operation of the air-cleaner from causing noise to occur indoors, or the durability of the air-cleaner or refrigerator from being deteriorated.

In the meantime, the light emitting diodes emit light when the air-cleaner operates. The light of the light emitting diodes is transmitted to the outside through the gap between the outlet through which air is discharged and the decor panel for opening and closing the outlet. Thus, it can be recognized whether the air-cleaner operates, without looking at the display of the air-cleaner.

The scope of the present invention is not limited to the embodiment described and illustrated above but is defined by the appended claims. It will be apparent that those skilled in the art can make various modifications and changes thereto within the scope of the invention defined by the claims. Therefore, the true scope of the present invention should be defined by the technical spirit of the appended claims.

What is claimed is:

1. A refrigerator, comprising:
a main body having a storage space formed therein; and
an air-cleaner, comprising:
    a case coupled to an exterior of the main body, the case having an inlet and an outlet;
    a blower positioned in the case so as to draw air into the case through the inlet and discharge air out of the case through the outlet; and
    at least one filter unit positioned between the inlet and the outlet so as to filter air as it moves through the case, wherein each filter unit comprises:
    a filter basket slidably coupled to the case;
    at least one filter positioned in the filter basket;
    a basket door coupled to the filter basket;
    a fastening device that couple the basket door to the filter basket;
    a guiding device that guides a sliding motion of the filter basket into and out of the case such that the basket door selectively opens and closes a filter opening in the case as the filter basket slides relative to the case; and
    a locking device that maintains a position of the filter basket in the case.

2. The refrigerator as claimed in claim 1, wherein the fastening device comprises:
- a fastening box that extends rearward from a rear surface of the basket door, wherein the fastening box has a hexahedral shape with an open rear face;
- at least one elastically deformable fastening hook provided on the fastening box, the fastening hook having a catching protrusion provided on a distal end thereof;
- at least one contact rib that extends rearward from the fastening box;
- a fastening portion that extends horizontally forward from a front surface of the filter basket such that an upper inside surface of the fastening box closely contacts a corresponding upper surface of the fastening portion; and
- a fastening piece extending downward from a distal end of the fastening portion so as to be elastically fastened to the at least one fastening hook, with a rear edge portion engaged with the catching protrusion and a front portion in close contact with a distal end of the at least one contact rib.

3. The refrigerator as claimed in claim 2, wherein the basket door is coupled to the filter basket so as to have a plurality of positions relative to the filter basket.

4. The refrigerator as claimed in claim 3, wherein a distal end of the fastening piece is spaced apart by a predetermined distance from a lower inside surface of the fastening box, and corresponding ends of the fastening portion and fastening piece are spaced apart by a predetermined distance from respective inner side surfaces of the fastening box.

5. The refrigerator as claimed in claim 1, wherein the guiding device comprises:
- a guide groove formed along a bottom inner surface of the case, along a sliding direction of the filter basket; and
- at least one support rail formed in an interior of the guide groove and extending along the sliding direction of the filter basket so as to support a bottom surface of the filter basket on an upper surface of the support rail.

6. The refrigerator as claimed in claim 1, wherein the locking device comprises:
- a push latch provided on one of a front surface of the case or a rear surface of the basket door; and
- a latch hook provided on the other of the front surface of the case or the rear surface of the basket door, wherein the latch hook is inserted into and engaged by the push latch when the basket door is in close contact with the front surface of the case.

7. The refrigerator as claimed in claim 6, wherein the locking device further comprises an elastic member provided in the case, wherein the elastic member exerts an elastic force on the filter basket in a direction in which the filter basket is drawn out of the case.

8. The refrigerator as claimed in claim 1, wherein the blower comprises:
- a fan housing;
- a cross flow fan installed in the fan housing, the cross flow fan having a horizontally installed rotating shaft; and
- a driving motor that drives the cross flow fan.

9. The refrigerator as claimed in claim 8, further comprising a side guide portion that extends perpendicular from a ceiling surface or a floor surface of the case, wherein an upper surface or a lower surface of the fan housing is supported by a support portion protruding on the ceiling surface or the floor surface of the case, and at least one of upper or lower peripheral edges of the fan housing at least partially contact the side-guide portion.

10. The refrigerator as claimed in claim 9, further comprising a vibration preventing device that prevents vibration generated by the blower from being transmitted to the air-cleaner and the main body, wherein the vibration preventing device includes a shock absorbing portion provided between the fan housing, the side guide portion and the support portion, and between the fan housing and the ceiling or floor surface of the case.

11. The refrigerator as claimed in claim 1, further comprising a display unit that emits light when the air-cleaner operates, wherein the light emitted by the display unit is transmitted to the outside through a gap formed between the outlet of the case and a decor panel that selectively opens and closes the outlet.

12. The refrigerator as claimed in claim 11, further comprising a shield plate provided between the outlet and the display unit, wherein the light emitted by the display unit is transmitted through the shield plate to the outside.

13. The refrigerator as claimed in claim 12, wherein the display unit comprises a light emitting diode provided on a printed circuit board.

14. The refrigerator as claimed in claim 13, further comprising at least one insertion piece provided on a lower inner surface of the case adjacent to the outlet and arranged in a straight line in parallel with the outlet, wherein a lower end of the printed circuit board is positioned in the at least one insertion piece.

15. A refrigerator, comprising:
- a main body having a storage space formed therein; and
- an air-cleaner, comprising:
  - a case coupled to an exterior of the main body, the case having an inlet and an outlet;
  - a blower positioned in the case so as to draw air into the case through the inlet and discharge air out of the case through the outlet; and
  - at least one filter unit positioned between the inlet and the outlet so as to filter air as it moves through the case, wherein each filter unit comprises:
    - a filter basket slidably coupled to the case;
    - at least one filter positioned in the filter basket;
    - a basket door coupled to the filter basket; and
    - a fastening device that fastens the basket door to the filter basket such that the basket door has a plurality of positions relative to the filter basket.

16. The refrigerator as claimed in claim 15, wherein the fastening device comprises:
- a fastening box that extends rearward from a rear surface of the basket door, wherein the fastening box has a hexahedral shape with a rear face opened;
- at least one elastically deformable fastening hook provided on the fastening box, the fastening hook having a catching protrusion provided at a distal end thereof;
- at least one contact rib that extends rearward from the fastening box;
- a fastening portion that extends horizontally forward from a front surface of the filter basket such that an upper inside surface of the fastening box closely contacts a corresponding upper surface of the fastening portion; and
- a fastening piece extending downward from a distal end of the fastening portion so as to be elastically fastened to the at least one fastening hook, with a rear edge portion engaged with the catching protrusion and a front portion in close contact with a distal end of the at least one contact rib.

17. A refrigerator, comprising:
a main body having a storage space formed therein; and
an air-cleaner, comprising:
- a case coupled to an exterior of the main body, the case having an inlet and an outlet;
- a blower positioned in the case so as to draw air into the case through the inlet and discharge air out of the case through the outlet; and
- at least one filter unit positioned between the inlet and the outlet so as to filter air as it moves through the case, wherein each filter unit comprises:
  - a filter basket slidably coupled to the case;
  - at least one filter positioned in the filter basket;
  - a basket door coupled to the filter basket; and
  - a locking device that maintains a position of the filter basket in the case, wherein the locking device comprises:
    - a push latch provided on one of a front surface of the case or a rear surface of the basket door;
    - a latch hook provided on the other of the front surface of the case or the rear surface of the basket door, wherein the latch hook is inserted into and engaged by the push latch when the basket door is in close contact with the front surface of the case; and
    - an elastic member provided in the case, wherein the elastic member exerts an elastic force on the filter basket in a direction in which the filter basket is drawn out of the case.

18. A refrigerator, comprising:
a main body having a storage space formed therein; and
an air-cleaner, comprising:
- a case coupled to an exterior of the main body, the case having an inlet and an outlet;
- a blower positioned in the case so as to draw air into the case through the inlet and discharge air out of the case through the outlet;
- at least one filter unit positioned between the inlet and the outlet so as to filter air as it moves through the case; and
- a vibration preventing device that prevents vibration generated by the blower from being transmitted to the air-cleaner and the main body, wherein the blower comprises:
  - a fan housing;
  - a cross flow fan installed in the fan housing, the cross flow fan having a horizontally installed rotating shaft; and
  - a driving motor that drives the cross flow fan.

19. The refrigerator as claimed in claim 18, further comprising a side guide portion that extends perpendicular from a ceiling surface or a floor surface of the case, wherein an upper surface or a lower surface of the fan housing is supported by a support portion protruding on the ceiling surface or the floor surface of the case, and at least one of upper or lower peripheral edges of the fan housing at least partially contact the side-guide portion.

20. The refrigerator as claimed in claim 19, wherein the vibration preventing device includes a shock absorbing portion provided between the fan housing, the side guide portion and the support portion, and between the fan housing and the ceiling or floor surface of the case.

21. A refrigerator, comprising:
a main body having a storage space formed therein; and
an air-cleaner, comprising:
- a case coupled to an exterior of the main body, the case having an inlet and an outlet;
- a blower positioned in the case so as to draw air into the case through the inlet and discharge air out of the case through the outlet; and
- at least one filter unit positioned between the inlet and the outlet so as to filter air as it moves through the case; and
- a display unit that displays an operational state of the air cleaner, wherein the display unit emits light when the air-cleaner operates, and the light emitted by the display unit is transmitted to the outside through a gap formed between the outlet of the case and a decor panel that extends across the outlet so as to selectively open and close the outlet.

22. The refrigerator as claimed in claim 21, further comprising a shield plate provided between the outlet and the display unit, wherein the light emitted by the display unit is transmitted through the shield plate to the outside.

23. The refrigerator as claimed in claim 22, wherein the display unit comprises a light emitting diode provided on a printed circuit board.

24. The refrigerator as claimed in claim 1, wherein the at least one filter unit comprises first and second filter units, and wherein the case comprises:
- a blower case that houses the blower, the blower case including an outlet opening formed in a front surface of the blower case that defines the outlet of the case;
- a first filter case coupled to a first lateral side of the blower case, wherein the first filter case houses the first filter unit, the first filter case including a first inlet opening formed in an outer lateral side thereof that defines a first portion of the inlet into the case; and
- a second filter case coupled to a second lateral side of the blower case opposite the first lateral side, wherein the second filter case houses the second filter unit, the second filter case including a second inlet opening formed in an outer lateral side thereof that defines a second portion of the inlet into the case.

25. The refrigerator as claimed in claim 24, wherein the case further comprises a decor housing that extends across front lateral sides of the blower housing and the first and second filter housings, wherein the decor housing comprises:
- a decor plate that extends across the outlet opening to selectively open and close the outlet;
- a first filter through hole positioned corresponding to a front lateral surface of the first filter case such that the first filter unit slides into and out of the first filter case through the first filter through hole; and
- a second filter through hole positioned corresponding to a front lateral surface of the second filter case such that the second filter unit slides into and out of the second filter case through the second filter through hole.

26. The refrigerator as claimed in claim 25, further comprising a driving unit that selectively moves the decor plate relative to the decor housing so as to selectively open and close the outlet, wherein the driving unit comprises:
- a rack provided on one of the decor housing or the decor plate;
- a gear provided on the other of the decor housing or the decor plate; and
- a motor coupled to the gear so as to rotate the gear and move the decor plate relative to the decor housing.

27. The refrigerator as claimed in claim 26, wherein the decor plate is movably coupled to the decor housing such that the decor plate is positioned flush against the decor housing to close the outlet, and slides outward from the decor housing to open the outlet as the gear moves along the rack, wherein air is discharged from the case through a gap formed between the decor housing and the decor plate.

28. The refrigerator as claimed in claim 27, wherein the respective basket doors of each of the first and second filter units are flush with the decor housing when the first and second filter units are fully inserted into the first and second filter housings, and the respective basket doors slide away from the decor housing so as to slidably remove the first and second filter units from the first and second filter housings.

29. The refrigerator as claimed in claim 28, wherein the at least one filter comprises a plurality of filters positioned in parallel in the filter basket, and wherein each of the plurality of filters is individually removeable from its respective filter basket when the first and second filter units are slidably removed from the first and second filter housings.

30. The refrigerator as claimed in claim 1, wherein the air cleaner draws external air from outside of the refrigerator into the case and through the at least one filter unit, and discharges filtered air from the case to the outside of the refrigerator through the outlet.

* * * * *